May 27, 1958 — H. B. SCHULTZ — 2,836,456
COLLAPSIBLE CAMPING TRAILER
Filed March 18, 1954 — 2 Sheets-Sheet 1
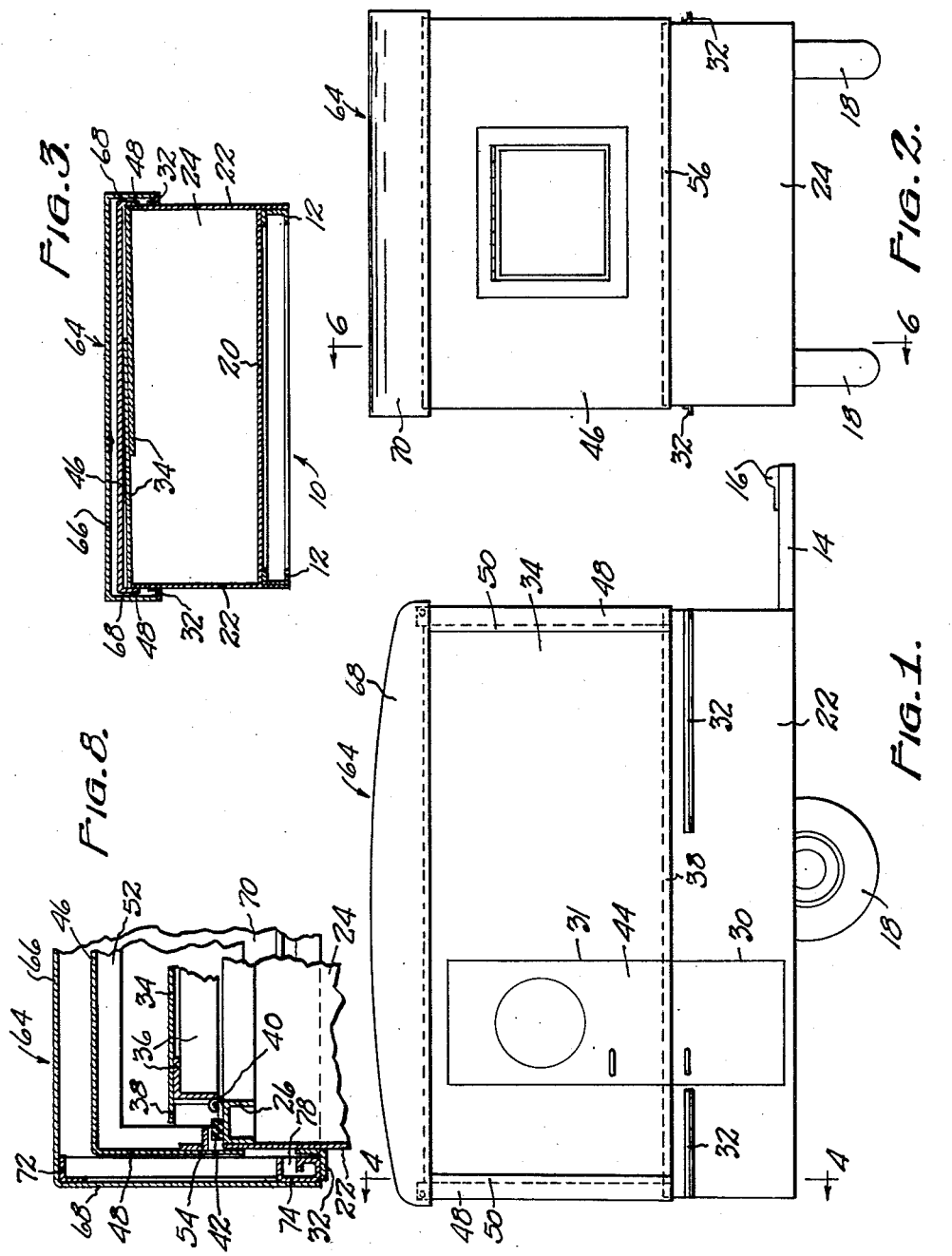
INVENTOR.
HAROLD B. SCHULTZ.
BY
Eugene C. Knoblock.
ATTORNEY.

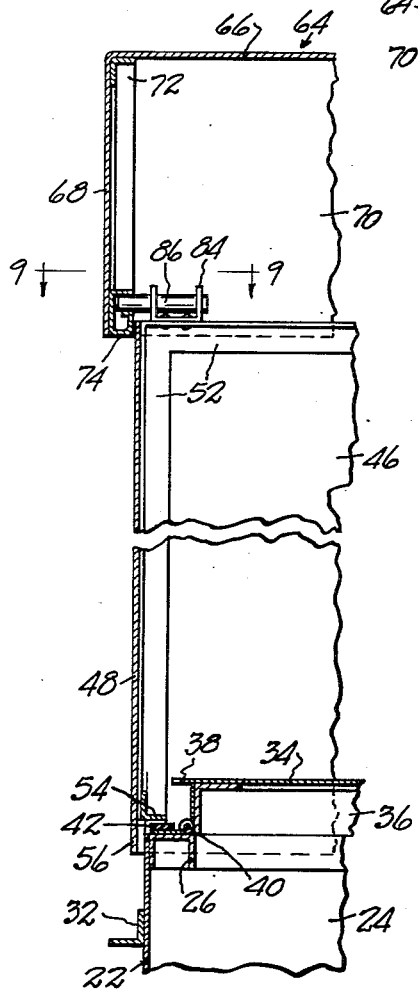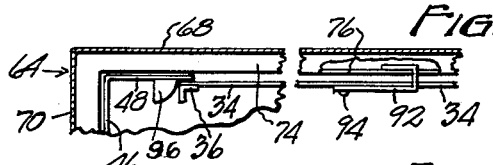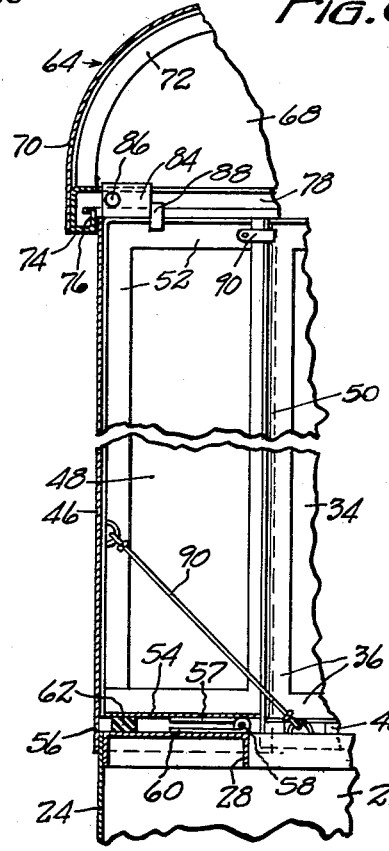

United States Patent Office 2,836,456
Patented May 27, 1958

2,836,456

COLLAPSIBLE CAMPING TRAILER

Harold B. Schultz, South Bend, Ind.

Application March 18, 1954, Serial No. 417,051

9 Claims. (Cl. 296—23)

This invention relates to improvements in collapsible camping trailers.

The primary object of the invention is to provide a collapsible camping trailer which is sturdy when erected, which collapses to small compass, which is substantially weather-tight and waterproof, which can be erected quickly by one individual, and which is completely protected against the weather when in its collapsed condition.

A further object is to provide a collapsible trailer which has a substantial storage space therein when collapsed so that items of furniture may be positioned within the trailer and may remain in the same position when collapsed as when the trailer is erected and the items are in use.

Other objects will be apparent from the following specification.

In the drawings:

Fig. 1 is a side view of the trailer in erected position;

Fig. 2 is a rear view of the trailer in erected position;

Fig. 3 is a substantially schematic transverse sectional view illustrating the trailer in collapsed position;

Fig. 4 is an enlarged fragmentary transverse sectional view taken on line 4—4 of Fig. 1;

Fig. 5 is a fragmentary sectional view similar to Fig. 4 but illustrating the side panels in erected position;

Fig. 6 is a fragmentary longitudinal sectional view taken on line 6—6 of Fig. 2;

Fig. 7 is a fragmentary sectional view illustrating the relation of the top to an end unit in the collapsed position of the device;

Fig. 8 is a fragmentary detail sectional view taken on line 4—4 of Fig. 1 and illustrating the parts in collapsed position; and Fig. 9 is a fragmentary horizontal sectional view taken on line 9—9 of Fig. 4.

Referring to the drawings which illustrate the preferred embodiment of the invention, the numeral 10 designates the frame of a trailer which preferably includes a plurality of longitudinal frame members 12, such as channels, which are fixedly connected by cross-members and from which projects at one end a tongue 14 which mounts a trailer hitch 16 at its outer end. The trailer frame is supported by wheels 18 mounted upon a suitable axle (not shown) which supports the frame preferably through the intermediary of springs (not shown).

A lower or fixed body portion is supported upon the frame 10 and preferably includes a bottom or floor member 20, longitudinal side walls 22, and end walls 24. The upper margins of the side and end walls 22 and 24 preferably terminate in a common plane and are reinforced. Inverted channel members 26 are illustrated as being secured along the upper margins of the side panels 22 and extending into the body of the trailer. Inverted channel members 28, preferably of a greater width than the channels 26, are secured to the end walls 24 at the upper margin thereof and extend inwardly therefrom. The reinforcing members 26 and 28 will be secured to each other, as are the wall panels 22 and 24, thus providing a rigid box-like construction. Side panels 22 may be interrupted by a door opening 30. The side panels serve additionally to mount longitudinal brackets or supports 32 at their opposite ends, which brackets are here shown as angle irons projecting laterally outwardly from the walls on which they are mounted and spaced below the top edges of the panels 22.

Two side walls 34 are provided, one at each side of the trailer, and each of a length shorter than the length of the side panel 22 of the lower portion of the trailer. Each side wall will preferably be provided with a marginal reinforcing frame which may be formed of angle irons 36, as illustrated. The angle irons 36 at the lowermost portion of each wall is preferably positioned spaced above the bottom edge of that wall so that a portion 38 of each side wall or panel projects below said lowermost reinforcing member 36. An elongated hinge 40, preferably of the piano-hinge type to extend substantially full length of the wall 34, has one hinge leaf thereof secured to the lowermost reinforcing flange 36 of the side wall, and the other hinge leaf thereof is secured to the top surface of the reinforcing member 26 of the understructure. The hinge will preferably be so arranged that the pivot axis thereof will be located adjacent the inner margin of the members 26 and 36 and spaced from the plane of the side wall 34 when the latter is erected, as illustrated in Fig. 5. In this arrangement of the parts, the projecting parts 38 of the side walls will extend below the level of the top of the side panels 22 of the lower structure. Furthermore, the hinge will be so oriented that each side panel 34 will be positioned in a plane parallel to and preferably in contact with the upper margin of the side panel 22 when member 34 is erected. A gasket strip 42 will preferably extend along the top of the member 26 and may be formed of felt, rubber or other material, to provide an effective seal against the entry of moisture, dirt and wind through the joint between the side wall 34 and the panel 22.

At least one of the panels 34 will preferably be interrupted by the upper margin 31 of a door opening registering with the door opening portion 30 in the lower panel 22. A door 44 is adapted to close the door opening 30, 31 and may either be of one piece or of two pieces. Where made of one piece, the door must be removed to accommodate collapse of the trailer. Where made of two pieces, means must be provided to hinge each of the sections to the adjacent panel and, if desired, means may be provided to connect the upper and lower panels of the door, although this is not essential or required and a Dutch door effect may be employed instead.

An end unit is mounted at each end of the lower portion of the trailer body. Each end unit preferably includes an end wall 46 and side wing panels 48. The panels 48 are spaced apart a distance slightly greater than the spacing between the outer surfaces of the side walls 34 when the latter are erected, and are of a width to partially overlap the end margins of the side walls at 50 as illustrated in Figs. 1 and 6. Each end unit is provided with a reinforcing frame structure consisting of angle irons or other reinforcing members 52. A member 54 extends in a longitudinal substantially horizontal position, as illustrated in Fig. 6, when the end unit is erected, and may either span the wing panels 48 or may constitute an angle iron as illustrated in Fig. 8. This member is located above the bottom of the end unit so that the lower marginal portions 56 of both panels 46 and 48 of the end unit project therebelow. The member 54 has attached thereto one leaf 57 of a hinge 58 whose opposite leaf 60 is secured to the frame member 28 at the end of the lower portion of the trailer body. The hinge pintle 58 is preferably located adjacent the inner margin of the member 28 and adjacent the inner or free margins of the side wing panels 48, as best shown in Fig. 6. A combination cushioning and sealing strip 62 extends lengthwise of each member 28 adjacent the outer margin thereof and is borne upon continuously by the part 54 or some other part of the end unit to provide a seal against dust, wind and weather. As best seen in Figs. 4 and 6, the lower margins 56 of the end panels 46 and their side wing panels 48 project below the level of the top of the member 28, and the parts are preferably so arranged that the end wall 46 will lie adjacent to the end panel 24 of the lower structure when the unit is erected as illustrated in Fig. 6, and the side wings 48 will lie close to side panels 34, as illustrated in Fig. 5. The sealing strip 42 may extend lengthwise along each side panel 22 of the lower structure and beyond the ends of the hinge 40 to seal the structure at the end wing panels 48.

A rigid top unit 64 completes the trailer body and is of a size to completely span the top of the body when erected. The top unit has a top panel 66 which may be curved as illustrated in Fig. 1. Longitudinal panels 68 depend from the sides of the top panel, and the ends of the top panel are downturned at 70. The roof unit will preferably be reinforced, as by angle irons 72 at the junction of the panels 64 and 68, and by a marginal reinforcing member 74 and by cross-beams (not shown). The member 74 may be of any cross-sectional configuration found suitable, and as here shown takes substantially the form of a channel having a flange 76 extending partially across the open mouth thereof so as to define a narrow or reduced dimension guide passage 78 lengthwise thereof. The passages 78 are provided along the lower margins of the side panels 68 of the top unit and extend from the opposite ends of the unit a distance substantially equal to the vertical dimension of the end units 46, 48. At their inner ends the members 74 are preferably upturned to provide terminal guide passages 80, as best illustrated in Fig. 7. Additional marginal bracing means 82 may be provided at the lower margin of the side panels 68 between the upturned portions 74 of adjacent guide channels.

Each of the reinforcing members 52 at the upper ends of the opposite side wings 48 of the end units mounts a carrier 84 for a guide member 86, such as a roller, adapted to extend into the guide passage 78 for guided movement therein. As best illustrated in Fig. 4, the carrier 84 may constitute a U-shaped member whose opposite legs are spaced transversely of the trailer, and the roller 86 may be an elongated cylindrical bar or rod journaled in apertures in the bracket legs 84 and projecting outwardly and laterally to enter the groove 78. It will be understood that each end unit will mount two carriers located at opposite sides of the upper end thereof.

The parts are so proportioned and arranged that they assume the position illustrated in Fig. 3 when collapsed. Thus the two panels 34 will preferably be of a vertical dimension less than the width of the trailer, so they may fold inwardly into partially overlapping relation as shown in Fig. 3, and will lie entirely within the overall outline of the trailer body. The end panels are preferably of a height less than one-half of the length of the trailer body, so that they may be folded in a longitudinal direction about axes transverse of the trailer body to positions overlying the panels 34. The inward movement of the end panels causes the rollers 86 to traverse the frame guides 78 of the top unit, thereby automatically lowering the top as the end panels swing. The top unit 64 is of inverted cup-shaped form and fits around the superimposed end panels and side panels in the manner best illustrated in Fig. 8, and finds support upon the flanges 32 at the opposite sides of the lower rigid part of the trailer. The assumption of this position is accommodated by the bent portion 80 of the roller guide 74, as seen in Fig. 7, which permits the rollers to move out of the longitudinal track at the lower margin of the top unit to a position adjacent to the top panel 66, as seen in Figs. 7 and 8. Each of the side panels 34 can be lowered easily without disturbing either of the end panel units, and thereafter the end panel units can be lowered successively, since the top unit 64 is free to assume a tilted position to accommodate lowering of first one end and then the other end thereof.

The erection of the trailer from the Fig. 3 position to the Fig. 1 position is accomplished by a reverse procedure. Thus the top unit 64 is raised at one end thereof with the rollers 86 on the adjacent end panel following the curved guide 80, and thence traversing the longitudinal guides 78 until the end panel has been erected or is substantially erect. A clip 88 may then be secured to the guide 74 and to the reinforcement 52 at an end wing 48, as shown in Fig. 6, to prevent relative movement of the end unit and the top unit. Thereupon the opposite end of the top unit can be elevated with incident raising of the opposite end wall unit. Each end wall unit will preferably be provided with means to prevent swinging thereof outwardly past upright position, and such means may constitute a cable 90, as seen in Fig. 6, or a chain or folding brace. If only one individual is available, the operation can be accomplished manually by him, although it will be understood that the operation is facilitated if two people can cooperate in performing it. After the opposite end wall units have been erected, the side wall panels 34 can be swung to erect position, and suitable means, such as the latch 90 shown in Fig. 6, may be provided to hold the side walls 34 in elevated position, the means 90 being here shown as being carried by the upper ends of the end wing units 48. Also, hook members 92, shown in Fig. 9, may be pivoted to the side walls 34 at 94 to engage flanges 76 of reinforcing members 74 of the top. Also, if desired, sealing gaskets (not shown) may be interposed between the parts 34 and 48 at the overlap 50 therebetween.

The panels 22 and 24 of the lower part of the trailer body preferably extend above the trailer floor 20 a distance sufficient to accommodate permanent installation of beds, chests, stools and other items of furniture within the trailer, all positioned at a level below the position which the side walls 34 assume when collapsed, as illustrated in Fig. 3. Such items of furniture may, in fact, be employed as the supports to position the inner ends of the side walls 34, although, alternatively, other means, such as props (not shown), may be employed for this purpose. Consequently, only a minimum amount of manipulation and adjustment of the interior parts or furnishings of the trailer is required to accommodate collapse thereof after use has ended and preparatory to transport. This factor reduces to a minimum the vertical dimension of the side and end walls 34 and 46 so that their weight is held at a minimum to be conveniently manipulated and to accommodate their construction from light weight components. Also, if desired, folding bunks (not shown) may be mounted on the side walls 34, or end walls 48. The various parts of the trailer body may be formed from any material found suitable, such as sheet metal panels, plywood panels, hard board composition panels, or glass reinforced plastic panels. The top unit 64 may be formed from any of these materials.

In the collapsed position of the parts shown in Fig. 3, only the roof unit 64 and the lower permanent body unit 22, 24 is visible, and the roof unit serves as a cap to embrace and conceal the folded side and end walls. The trailer body has a very low center of gravity in its collapsed condition and, therefore, can be towed easily without great wind resistance and without obstructing the rear vision of the driver of the towing vehicle. The capping of the trailer body and its contents by the lowered top unit 64 insures against entry of dirt and moisture itno the collapsed trailer body. Furthermore, the support of the margins of the top unit 64 upon the flanges 32 eliminates any possibility of injury to the collapsed panels 34 and 46, as might occur if the weight of the top unit 64 were applied directly thereon.

The trailer body is substantially wind- and weather-tight when erected, as will be seen by the overlapping relation of the lower marginal portions of the vertical panels 34 and 46 relative to the walls 22, 24 of the lower fixed portion of the trailer body. Likewise, a lapped relation exists between the lower margin of the walls 68 and 70 of the trailer top 64 with respect to the upper margins of the vertical panels 34 and 46. The anchorage of the top to the end walls through the intermediary of the rollers 86 and the track members 74 holds the trailer body erect so that it will resist wind pressure. Also, camming wedges 96 may be mounted on the end wing panels 48 to engage the ends of the side walls 34 and prevent relative movement of said parts in a direction lengthwise of the trailer. Sufficient overlap between the side wing panels 48 and the side panels 34 may likewise be provided, together with the use of gasket strips if desired, to seal the joints of the trailer body at these points. Thus the trailer will provide effective shelter to campers and travelers even in inclement weather.

The formation of the end wall units with short sections of side wings integral therewith and the hinged connection of those end wall units adjacent the free or inner ends of the wings accommodates a folding relation of the parts in which the end wall units are clear of the side wall units, that is, in which the end wall units lie, in their collapsed position, in a plane spaced above the top of the permanent walls 22, 24 of the trailer a distance equal to the width of the end wings thereof and sufficient to receive the infolded side walls therebelow. In addition, this construction of the end units strengthens the entire trailer body and the end units themselves and renders the entire structure sturdy and stable when erected.

While the preferred embodiments of the invention have been illustrated and described, it will be understood that changes in the construction may be made within the scope of the appended claims without departing from the spirit of the invention.

I claim:

1. A collapsible trailer comprising a wheeled vehicle having a rigid open-topped box-like body including fixedly connected side and end panels, each panel having an inwardly projecting ledge at its upper end, said ledges lying in a common horizontal plane, a pair of rigid end wall units, a pair of rigid side wall units, one pair of wall units having vertical end wings projecting therefrom and lapping the other wall units when erected means pivotally connecting each wall unit to said body at said ledge spaced above the lower edge of the wall unit and adjacent the inner edges of said ledges, said pivot axes lying in a common horizontal plane but spaced differently relative to said body panels, whereby said wall units lap the upper portion of said body when erected and lie spaced above the ledges and some panels lie at different levels than others when swung to collapsed substantially horizontal position, a rigid top having depending marginal walls, lapping the upper margins of said pivoted wall units when erected and fitting therearound when said pivoted wall units are collapsed and a shiftable connection between said top and two of said wall units accommodating conjoint shifting of said top and connected wall units.

2. A collapsible trailer as defined in claim 1, and gasket strips extending longitudinally on said ledges and engageable by said wall units when erected, whereby the joint between each wall unit and the body is sealed.

3. A collapsible trailer as defined in claim 1, wherein wedges are carried by said wings and engaged by said side walls when erected to rigidify said trailer.

4. A collapsible trailer comprising a wheeled vehicle having a body including fixedly connected bottom, side and end panels, rigid side walls pivoted to the upper portions of said side panels and adapted to swing inwardly to superimposed substantially horizontal position, rigid end walls pivoted to the upper portions of said end panels to swing inwardly and overlie said side walls, a rigid roof unit, and shiftable means connecting said roof panel and end walls whereby said end walls are moved from collapsed to erected position as said roof is raised, said connecting means constituting a longitudinal guide on the lower portion of a side of the roof unit and a roller projecting above and laterally from each pivoted end wall and seating in said guide, said guide having an upturned inner portion accommodating lowering of said roof unit to surround said end wall when collapsed.

5. A collapsible trailer comprising a wheeled vehicle having a body including fixedly connected bottom, side and end panels, rigid side walls pivoted to the upper portions of said side panels and adapted to swing inwardly to superimposed substantially horizontal position, rigid end walls pivoted to the upper portions of said end panels to swing inwardly and overlie said side walls, a rigid unitary roof unit having rigid depending side and end portions adapted to fit around and enclose said pivoted side and end walls when collapsed and the upper part of said fixed side and end body panels, a pair of opposed pivoted walls having fixedly connected thereto inwardly projecting vertical marginal parts positioned in lapped relation to adjacent pivoted walls when erected, said marginal parts carrying pivots spaced from the associated walls to position said associated walls spaced above said adjacent walls when in collapsed position, each pivoted wall overlapping the upper marginal part of the adjacent fixed body panel when erected, said pivoted side and end walls abutting the depending side and end portions of said roof unit when erected, and shiftable means connecting said roof panel and end walls whereby said end walls are moved from collapsed to erected position as said roof is raised.

6. A collapsible trailer as defined in claim 5, wherein said angularly projecting vertical marginal parts constitute longitudinally extending side wings mounted on said end walls.

7. A collapsible trailer as defined in claim 5, wherein said side walls terminate spaced from the ends of said body and said end walls include longitudinal wing portions lapping the ends of said side walls when erected.

8. A collapsible trailer as defined in claim 5, wherein each of said pivoted walls includes a horizontal inwardly projecting part spaced above its bottom edge, said walls being pivoted at the inner edges of said projecting parts in the same plane.

9. A collapsible trailer as defined in claim 5, wherein each wall is pivoted to said body in inwardly spaced relation to its plane and above its bottom edge, the pivot axes of all walls being located in a common horizontal plane.

References Cited in the file of this patent

UNITED STATES PATENTS

| | | |
|---|---|---|
| 1,998,937 | McGinnis | Apr. 23, 1935 |
| 2,066,342 | Gorton | Jan. 5, 1937 |
| 2,147,892 | Gray | Feb. 21, 1939 |
| 2,155,876 | Stout | Apr. 25, 1939 |
| 2,182,967 | Kors | Dec. 12, 1939 |
| 2,298,619 | Gorton | Oct. 13, 1942 |
| 2,395,691 | Smith | Feb. 26, 1946 |
| 2,725,602 | Francis | Dec. 6, 1955 |

FOREIGN PATENTS

| | | |
|---|---|---|
| 20,208 | Australia | Nov. 16, 1934 |
| 324,667 | Great Britain | Jan. 31, 1930 |

OTHER REFERENCES

Article, "How To Make Trailer Coupling and Other Parts," from "Autobody Trimmer and Painter" magazine, page 20, August 1934.